United States Patent [19]
Pelta

[11] Patent Number: 4,935,676
[45] Date of Patent: Jun. 19, 1990

[54] METHOD OF MOVING HEAD TO CORRECT FOR HYSTERESIS

[75] Inventor: Edmond R. Pelta, Los Altos Hills, Calif.

[73] Assignee: General Signal Corporation, Stamford, Conn.

[21] Appl. No.: 352,136

[22] Filed: May 15, 1989

Related U.S. Application Data

[63] Continuation of Ser. No. 39,525, Apr. 17, 1987.

[51] Int. Cl.$^5$ .............................................. H02K 41/00
[52] U.S. Cl. .......................................... 318/135; 310/12
[58] Field of Search ...................... 310/12, 13; 318/38, 318/135; 360/78, 13

[56] References Cited

U.S. PATENT DOCUMENTS

| | | | |
|---|---|---|---|
| 3,376,578 | 4/1968 | Sawyer | 310/13 |
| 4,230,978 | 10/1980 | Gardella, Jr. et al. | 318/135 |
| 4,437,049 | 3/1984 | Tullos et al. | 318/696 |

*Primary Examiner*—Patrick R. Salce
*Assistant Examiner*—Judson H. Jones
*Attorney, Agent, or Firm*—Ellsworth R. Roston; Charles H. Schwartz

[57] ABSTRACT

First and second portions having different magnetizable properties are alternately disposed on a stator. A head movable relative to the stator has first and second poles each having a pair of magnetizable legs contiguous to the stator and displaced from each other, and from the other pole legs, along a first axis relative to the stator portions. The poles introduce magnetic flux in the same direction to the legs. First and second windings, each respectively associated with the legs on an individual pole, produce in one leg a flux aiding the pole flux and in another a flux opposing the pole flux. Alternating currents flow through each winding at each instant at a frequency dependent upon the head speed to the produced along the first axis at that instant. The windings are programmed to provide signals for producing a movement of the head to a plurality of different destinations along the first axis. The windings are further programmed to produce a movement of the head to an intermediate position along the first axis before each movement of the head to a related destination along that axis. Each intermediate portion is displaced from the related destination by a particular distance, preferably short, in a particular direction from the related destination. This causes the head to move slowly from each intermediate position precisely to the related destination. This eliminates the effects of magnetic hysteresis in the movement of the head to the desired positions relative to the stator.

12 Claims, 2 Drawing Sheets

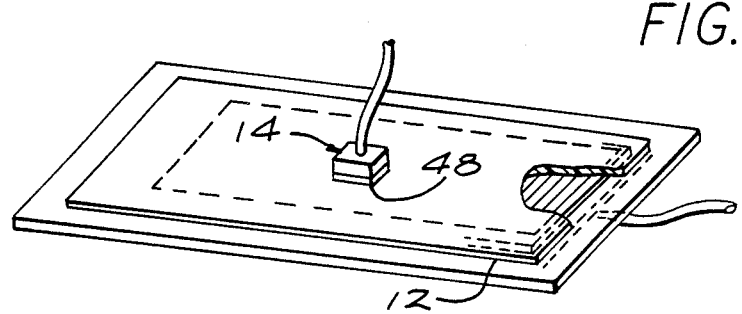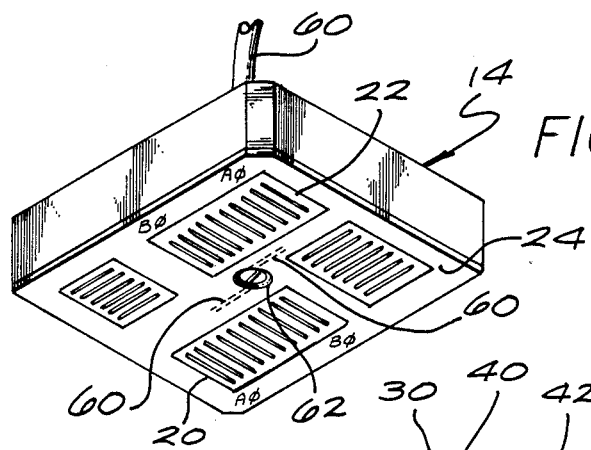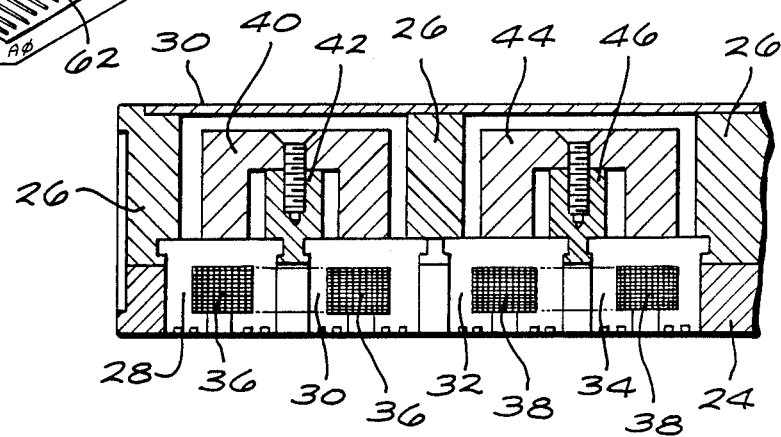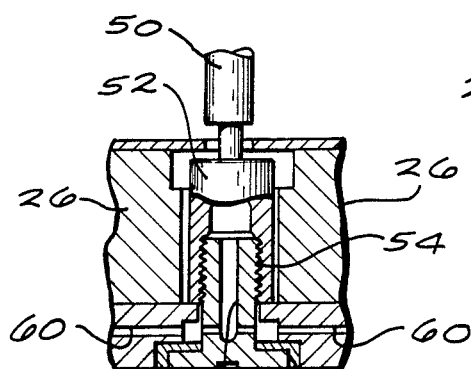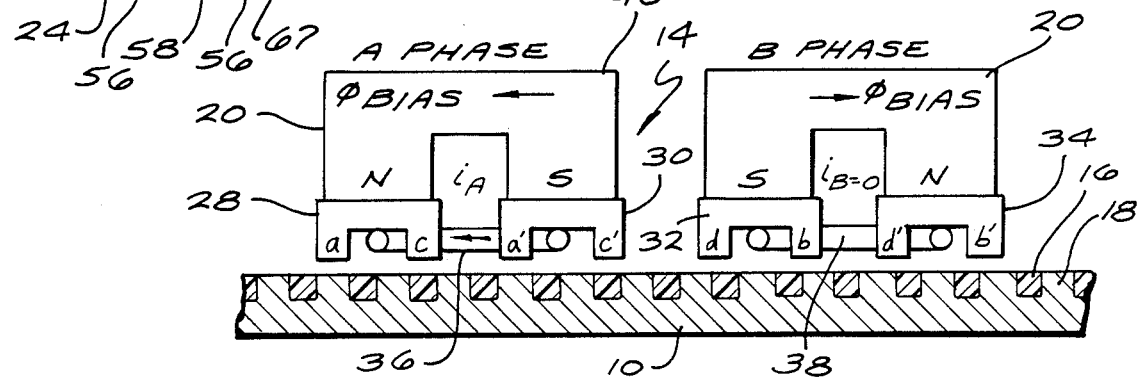

METHOD OF MOVING HEAD TO CORRECT FOR HYSTERESIS

This is a continuation of application Ser. No. 039,525 filed Apr. 17, 1987.

This invention relates to a method of moving a head to a precise position relative to a stator. More particularly, the invention relates to methods of moving a head to precise destination relative to a stator in spite of hysteresis effects produced between the head and the stator during such movement.

Linear motors have been in use for some time. The linear motors include a platen or stator and a head movable relative to the platen or stator. The linear motors have certain important advantages. For example, the heads can be driven at high speeds to desired positions with a minimal error. The motors are also advantageous because they can provide a movement of the head relative to the platen or stator (these terms being used interchangeably) along a single axis or simultaneously along a pair of coordinate axes. The stator can be small or quite large.

The stator in a linear motor is formed from first and second alternately disposed portions. The first portions in the stator are magnetizable properties and the second portions are nonmagnetic. The head is precisely positioned relative to these portions on the stator in accordance with instructions applied to the head. The instructions are translated into instantaneous frequencies and phases of two signals each having a 90° phase relationship with respect to the other signal. These signals are applied to the head to obtain a movement of the head relative to the stator at each instant at a speed related to the frequencies of the signals applied to the head at that instant. The phases of the signals at each instant control the acceleration or deceleration of the head at that instant.

Although the linear motors now in use are able to move the head relative to the stator with considerable precision, undesirable errors still occur in moving the head from one position to a second position relative to the stator. These errors particularly occur when the head is moved through a considerable distance between the two positions at a relatively high speed. The error is particularly pronounced when the head moves to any desired position on the stator at different times from different directions.

The errors described in the previous paragraph result from hysteresis effects produced in the motor, particularly when the head and the stator are formed from materials having magnetic properties. These hysteresis effects produce a loss of energy in the head, particularly when the head is moved at high speeds to a desired destination. The hysteresis effects may be magnetic and mechanical. The hysteresis effects also produce a remanent magnetization in the stator, particularly when the head is moved at the high speeds to the desired destination. These hysteresis effects and the effects of remanent magnetization produce minor, but sometimes significant, errors in the movement of the head to different positions relative to the stator in accordance with the programming provided in the head.

A considerable effort has been made, and considerable money has been expended in such effort, over a relatively long period of time to provide a system which includes a synchronous motor for producing a movement of a head in the motor precisely to a desired destination relative to a stator in accordance with programmings provided in the head. For example, systems have actually been created for reducing the hysteresis effects discussed in the previous paragraphs. One such system is disclosed and claimed in U.S. Pat. No. 4,455,512 issued to William J. Cornwell and William H. Lee on June 9, 1984 for "System For Linear Motor Control" and assigned of record to the assignee of record of this application. However, in spite of the favorable effect provided by the system of such patent, the problem of obtaining a precise positioning of the head relative to the platen, particularly after the movement of the head relative to the stator through considerable distances at high speeds, still persists.

In one embodiment of the invention, a method is provided to eliminate the effects of hysteresis on the movement of a head to any desired destination relative to a stator. The method is effective in eliminating the effects of hysteresis regardless of the direction in which the head is moved to the desired destination relative to the stator. The method is effective in eliminating the effects of hysteresis without the addition of any component to the system for moving the head relative to the stator.

In the embodiment of the invention, first and second portions having different magnetizable properties are alternately disposed on a stator. A head movable relative to the stator has first and second poles each having a pair of magnetizable legs contiguous to the stator and displaced from each other, and from the other pole legs, along a first axis relative to the stator portions. The poles introduce magnetic flux in the same direction to the legs.

First and second windings, each respectively associated with the legs on an individual pole, produce in one leg a flux aiding the pole flux and in another a flux opposing the pole flux. Alternating currents flow through each winding at each instant at a frequency dependent upon the head speed to the produced along the first axis at that instant.

The windings are programmed to provide signals for producing a movement of the head to a plurality of different destinations along the first axis. The windings are further programmed to produce a movement of the head to an intermediate position along the first axis before each movement of the head to a related destination along that axis.

Each intermediate position is displaced from the related destination by a particular distance, preferably short, in a particular direction from the related destination. This causes the head to move slowly from each intermediate position precisely to the related destination. This eliminates the effects of magnetic hysteresis in the movement of the head to the desired positions relative to the stator.

In the drawings:

FIG. 1 is a schematic perspective view of a linear motor which may be included in one embodiment of the invention;

FIG. 2 is an enlarged perspective view of a head which is included in the linear motor shown in FIG. 1;

FIG. 3 is an enlarged fragmentary sectional view of the head shown in FIG. 2;

Figure 6:
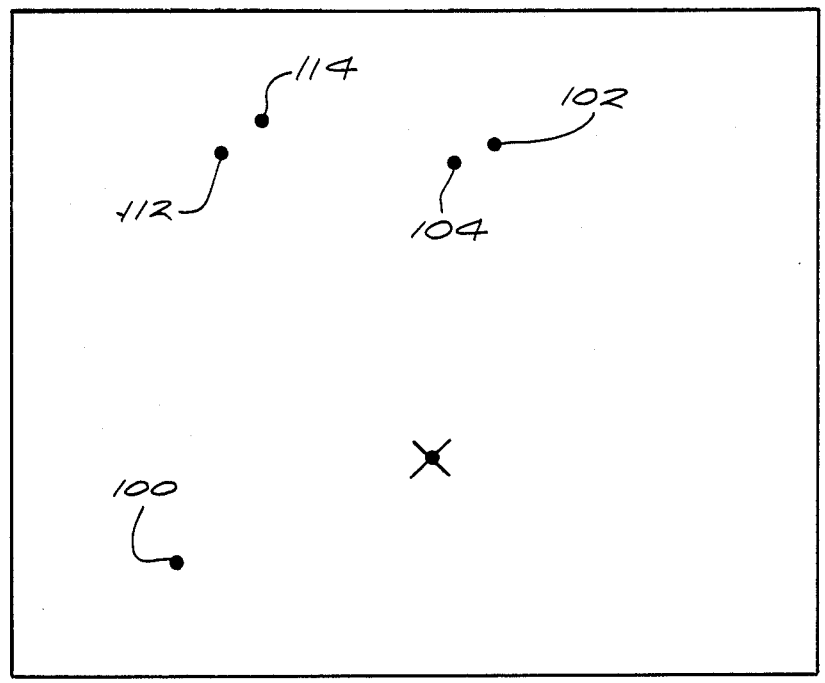

FIG. 4 an enlarged fragmentary sectional view of the head shown in FIGS. 1-3 and also of a platen which is included in the head shown in FIG. 1, the head and the platen being shown in front elevation;

FIG. 5 is an enlarged fragmentary sectional view of the head shown in FIG. 1-4, the head being shown in side elevation;

FIG. 6 is a schematic representation of the method of this invention to obtain controlled movement of the head relative to the stator to eliminate the effects of hysteresis in producing errors in the movement of the head to desired destinations relative to the stator.

Figure 7:
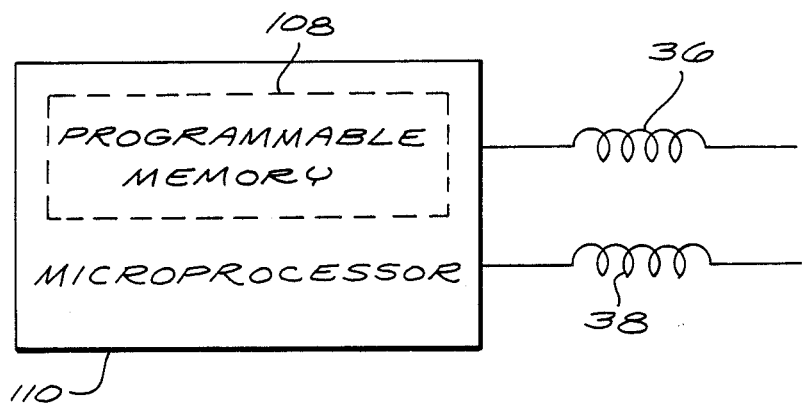

FIG. 7 is a circuit diagram schematically showing how a microprocessor can be programmed to obtain a controlled movement of the head relative to the stator to eliminate the effects of hysteresis on the desired positionings of the head.

In one embodiment of the invention, a linear reluctance motor generally indicated at 10 is provided with a stator 12 and a head 14. The stator 12 and the head 14 may be constructed to provide a movement of the head 14 relative to the stator 12 along a single axis on a pair of coordinate axes. The linear reluctance motor may be constructed in a manner similar to that disclosed and claimed in U.S. Pat. No. 3,376,578 issued to Bruce Sawyer on Apr. 2, 1968 for a "MAGNETIC POSITIONING DEVICE" and U.S. Pat. No. 3,457,482 issued to Bruce Sawyer on July 22, 1969 for a "MAGNETIC POSITIONING DEVICE".

When the linear reluctance motor is constructed to operate on magnetic principles such as disclosed in U.S. Pat. Nos. 3,376,578 and 3,457,482, the stator 12 may be made from a ferromagnetic material and may be provided with grooves 16 at spaced positions to define magnetic teeth 18. In a typical structure, the grooves 16 are 0.020 inches wide and 0.020 inches deep and are spaced 0.040 inches apart between centerlines. The spacing between the centerlines of the grooves may be left open with the air serving as a nonmagnetic material but it is preferred to fill the grooves with a plastic or other nonmagnetic solids to provide a smooth upper surface for the platen 12. In effect the grooves 16 and the teeth 18 define a grid structure.

When the movable member such as the head is movable relative to the stationary member such as the platen along a single axis, the movable member may include two sets of magnets 20 and 22 mounted in a housing or base 24 with the pole faces of the magnets at the surface of the base. Typically the base 24 may be an aluminum or plastic plate having two apertures for receiving the magnet sets. The magnet sets 20 and 22 are disposed substantially parallel to the platen 12 and are used to propel and position the head 14 along the platen. Although two magnets 20 and 22 are shown in the drawings, only one magnet set is sufficient to provide an operation of applicant's invention.

Since the construction of the two sets of magnets 20 and 22 may be the same, one will be described in detail. Each set may comprise two magnets and each magnet may have two pole pieces. The magnet set 20 includes a frame 26 and pole pieces 28, 30, 32 and 34. Each of the pole pieces 28, 30, 32 and 34 may comprise a stack of lamination stampings. A winding 36 may be wound in magnetically coupled relationship to the pole pieces 28 and 30 and a winding 38 may be wound in magnetically coupled relationship to the pole pieces 32 and 34. A U-shaped magnet 40 including the pole pieces 28 and 34 is fixed to a rib 42 of the frame 26 as by a screw and a similar magnet 44 including the pole pieces 32 and 34 is affixed to a rib 46 of the frame 26. The frame 26 is made from a nonmagnetic material such as aluminum and, in the preferred embodiment, the magnets 40 and 44 are permanent magnets which provide a: biasing or polarizing flux in the associated pole pieces. However, instead of making the magnets 40 and 44 from permanent magnets, the magnets 40 and 44 may be made from magnetizable material and magnetic flux may be produced in the pole pieces 28, 30, 32 and 34 by windings disposed on the magnets.

The bottom face of each of the pole pieces 28 and 30 has teeth of magnetizable material and preferably has a plurality of teeth of the same width and spacing as the teeth 18 and the grooves 16 of magnetic material in the platen 12. For example, the pole piece 28 may have a pair of teeth designated as "a" and "c" (FIG. 4) each of which has a width corresponding to the width of each of the teeth 18 and the groove 16 in the platen 12. Alternatively, each of the pole faces on the pole pieces 28 and 30 may comprise more than two (2) spaced teeth as illustrated in FIG. 3.

When the pole pieces 28 and 30 have the construction illustrated in FIG. 4, the teeth a and c are spaced such that, when one is over a tooth 18 of magnetic material on the platen 12, the other is over the groove 16 of nonmagnetic material on the platen. In other words, the spacing between the centerlines g of the teeth a and c may be $p(n \pm \frac{1}{2})$ where n is any whole number and p is the pitch of the grid on the platen 12 or the distance from a centerline of one groove or one tooth to the centerline of the next groove or tooth on the platen 12. The pole pieces 30, 32 and 34 are similarly constructed.

The pole piece 30 has magnetic teeth designated as a' and c'. The pole pieces 28 and 30 of the magnet 40 are spaced so that the magnetic teeth a and a' have the same disposition relative to the grooves 16 and the teeth 18 and the magnetic teeth c and c' also have the same disposition relative to the grooves 16 and the teeth 18. In other words, the magnetic teeth a and a' are at magnetic teeth 18 at the same time and the magnetic teeth c and c' are at magnetic teeth 18 at the same time.

The magnet 44 is constructed in a manner similar to the magnet 40. The magnets 40 and 44 are spaced so that, when the teeth of one magnet are directly over a tooth 18 or a groove 16, the teeth of the other magnet are midway between a tooth 18 and a groove 16. Thus the centerlines of corresponding teeth of the magnets 40 and 44 are $p(n \pm \frac{1}{4})$.

The two magnets of a set are respectively designated as the A-phase and B-phase magnets. In the preferred embodiment, using two parallel sets of magnets illustrated in FIG. 2, the magnets on one set such as the set 20 are arranged with the A-phase to the left and the B-phase to the left and the magnets on the other set are arranged with the B-phase to the left and the A-phase to the right. This arrangement provides improved balancing forces on the driving means such as the head 14 and minimizes any tendency for the head 14 to rotate on an axis normal to the top surface of the platen 12. With this arrangement, the magnets of one set are spaced $p(n+\frac{1}{4})$ and the magnets of the other set are spaced $p(n-\frac{1}{4})$.

In FIG. 4, when the current in the winding 36 for the A-phase magnet 40 is at full strength, any flux produced by the current is added to the bias flux produced by the permanent magnet 40 in the pole faces a and a' and is subtracted from the bias flux produced by the magnet in the pole faces c and c' to reduce the flux in the pole faces c and c' to a value of approximately zero. Since the teeth a and a' are directly over the teeth 18 in the platen 12, no force is produced by the teeth to move the head 14 along the platen 12.

When the current $i_A$ in the winding 36 for the A-phase magnet 40 is at full strength, any flux produced by the current $i_A$ is added to the bias flux produced by the permanent magnet 40 in the pole faces a and a' and is subtracted from the bias flux produced by the magnet in the pole faces c and c' to reduce the flux in the pole faces c and c' to a value of approximately zero. Since the teeth a and a are directly over the teeth 18 in the platen 12, no force is produced by the teeth to move the head 14 relative to the platen 12.

When the current $i_A$ for the winding 36 for the A-phase magnet 40 is at full strength, the current $i_B$ in the winding 38 for the magnet 44 is zero and the fluxes in the teeth d' and b' of the pole piece 34 are substantially identical. The magnitude of such fluxes may be one-half of that produced by the A-phase magnet through the teeth a and a' in FIG. 4 and is one-fourth of that produced in the teeth a and a' in FIG. 4 when the current $i_A$ flows through the winding 36. The d and d' teeth are angularly displaced from the b and b' teeth by 180° so that the net result is that the teeth b and b' and the teeth d and d' contribute no forces to move the head 14 along the platen 12. Under these conditions, the head 14 remains in the position of FIG. 4.

In order to step the head 14 to the right, the B-phase current is turned on with a polarity to cause the magnetic flux at d and d' to go to zero and the flux at b and b' to go to a maximum. When this occurs, a positive force is produced in the head 14 to move the head to the right in FIG. 4. When the head 14 has advanced to the right a quarter of a pitch in FIG. 4, the B-phase current may be turned off and the A-phase current may be turned on with a polarity opposite to that shown in FIG. 4. The head 14 will then move to the right through a distance corresponding to another one-fourth of a pitch so that the teeth c and c' will be positioned over the teeth 18 on the platen 12. For the next step, the A-phase current may be turned off and the B-phase current may be turned on with a plurality opposite to that described above. The next step is made by returning the current to that shown in FIG. 4. Stepping in the opposite direction is achieved by switching currents in the opposite sequence.

Actually, both of the windings 36 and 38 may be simultaneously energized by the respective ones of the A-phase and B-phase signals. The signals respectively applied to the windings 36 and 38 may be periodic signals having a quadrature relationship to each other. For example, sine signals may be applied to the winding 36 and cosine signals may be applied to the winding 38. When this occurs, the movement of the head 14 may be continuous rather than occurring in steps as described in the previous paragraph. The direction of movement of the head 14 along the stator 12 may be reversed by reversing the phase of one of the input signals such as the sine signal or by rotating the sectors of the input signals in the opposite direction.

The apparatus described above has certain important advantages. It provides a movement of the head 14 relative to the platen 12 in synchronism with the periodicity of the input signals applied to the windings 36 and 38. In other words, the head 14 moves through a distance corresponding to the pitch of the teeth 18 when the signals applied to the windings 36 and 38 have advanced through one cycle. Furthermore, the head can be accelerated and decelerated with a faster response time than in motors such as induction motors which are not synchronous.

The acceleration and deceleration of the head and the controlled movement of the head in synchronism with the periodicity of the input signal are also facilitated because there is no friction between the head and the stator during the movement of the head relative to the stator. Furthermore, since there is no friction between the head and the stator, the head can be fairly light. This facilitates the rapid acceleration and deceleration of the head and further facilitates the movement of the head at a high speed from a first position to any desired position removed from the first position.

As will be appreciated, the head 14 may carry an output member 38 such as a tool or a stylus. The various parts of the apparatus including the stator 12 and the head 14 are easily accessible and the output member 48 such as the tool or stylus can be easily viewed. Another advantage is that the head carries the output member 48 so that the positioning of the output member is directly related to the positioning of the head.

The apparatus described above also has certain other important advantages. Since the windings 36 and 38 receive periodic signals which are related to the displacement of the head relative to the stator, the displacement of the head along each coordinate axis can be determined at each instant by determining the number of cycles and fractions thereof of the periodic signals respectively applied to the windings 36 and 38. The displacement of the head along each coordinate axis can also be determined by providing magnetic pickoffs which move with the head past the teeth 18 and which produce a signal having a maximum amplitude during movement of the pickoffs past the teeth and which produce a signal having a minimum amplitude during movement of the pickoffs past the grooves 16. In this way, the pickoffs produce periodic signals where each periodic signal represents a displacement of the head through a distance corresponding to the pitch between adjacent teeth 18.

As previously described, the head 14 is disposed in spaced but contiguous relationship to the stator 12. Various means including air bearings may be used to provide such g spacing. For example, a control line 50 (FIG. 5) may constitute a conduit for a supply of air under pressure. The air conduit of the control line terminates on a tube 52 held in place by a screw 54 positioned in an aperture 56. A passage 58 in the screw 54 provides communication with passages 60 radiating outwardly from the screw and terminating in outlet openings 62 (FIG. 2).

The linear synchronous motor described above provides a movement of one member such as the head relative to another member such as the platen along linear coordinate axes such as the x and y axes. It will be appreciated, however, that motors movable along other coordinates may also be used in the system constituting this invention without departing from the scope of the invention. For example, motors movable along polar coordinates and motors rotatable on a particular axis may also be used in the system constituting this invention without departing from the scope of the invention. Such coordinates may constitute cylindrical or polar coordinates.

In the embodiment shown in FIGS. 1 through 5, four poles 28, 30, 32 and 34 are provided. These may actually be reduced to two (2). This may be seen from the fact that the pole piece 30 is actually superfluous in view of the pole piece 28 and the pole piece 34 is superfluous in view of the pole piece 32. Furthermore, under such circumstances the pole piece 30 may be replaced by the pole piece 32. However, the pole piece 32 may be disposed in the same position relative to the teeth 18 and the grooves 16 on the platen 10 as the positioning shown in FIG. 4 and described above.

As will be appreciated, the speed of movement of the head 14 relative to the platen 12 at each instant is dependent upon the frequency of the signals applied to the windings 36 and 38 at that instant. In an operative system, the frequency of the signals applied to the windings 36 and 38 may be varied in a range between zero (0) cycles per second and approximately two thousand (2,000) cycles per second. During periods of acceleration of the head 14, the frequency of the signals applied to the head may be progressively increased to increase the speed of the head at rates corresponding to such increases in frequency. During periods of constant speed, the frequency of the signals applied to the head 14 may be constant. When the head is being decelerated, the frequency of the signals applied to the windings 36 and 38 may be progressively decreased.

When the head 14 is moved through a large distance 6 between two successive destinations, it is accelerated rapidly to a maximal speed, is moved through most of the distance between the two successive destinations at the maximal speed and is then decelerated quickly at a position near the second of the two (2) destinations. Particularly when the head 14 is moved at high speeds relative to the stator 12, it produces hysteresis effects in the stator. These hysteresis effects cause energy losses to be produced in the motor defined by the head and stator. These energy losses may result in part from eddy currents produced in the stator and the head by changes in the fluxes produced in the stator and the head. The hysteresis effects may also result from mechanical causes. The hysteresis effects may also cause a remanent magnetization to be produced in the stator.

The energy losses and the remanent magnetization cause the actual destination of the head relative to the stator to be slightly different from the desired (or the second) destination. Furthermore, the actual destination may be different when the head is moving in one direction toward the desired destination than when it is moving in an opposite direction toward the desired direction.

This invention provides a method of overcoming the effects of hysteresis to position a head precisely and accurately at a desired position regardless of the distance of movement of the head 14 relative to the stator 12 and regardless of the speed of travel of the head to the desired position relative to the stator. The method of this invention may be seen from the schematic representation of FIG. 6. In this schematic representation, the head has been moved to a first desired position 100.

If it is now desired to obtain a movement of the head from the position 100 to a position 102, the head is first moved to an intermediate position 104 from the position 100 and is then moved to the position 102. The position 104 is displaced a relatively short distance (illustratively one quarter of an inch (¼")) from the desired position 102. The intermediate position 104 is disposed in a particular direction from the desired destination 104. For example, the intermediate position 104 may be at a suitable angle such as an angle of 45° from the desired position 102. This angle of 45° may be provided by g disposing the position 104 equal distances to the left and downwardly from the position 102.

The movement of the head from the position 100 to the intermediate position 104 and then to the related destination may be programmed into a programmable memory 108 in a microprocessor 110. It is believed that a person skilled in the art would know how to accomplish this, particularly since it has been known for some time how to program the movement of the head directly from the destination 100 to the destination 102. The programming of the memory 108 controls the introduction of signals to the windings 36 and 38.

Moving the head initially from the destination 100 to the intermediate position 104 and then to the related destination 102 has certain important advantages. Since the intermediate position 104 is quite close to the related destination 102, the head moves slowly from the intermediate position 104 to the related destination 102. (It will be appreciated that the slow movement of the head is not a necessary feature of the invention, the slow movement occurring because the head is programmed to move slowly through relatively short distances). Thus, hysteresis effects cannot prevent the head 14 from moving precisely to the related destination 102.

In like manner, the head 14 is moved from the destination 102 to an intermediate position 112 and then to a destination 114 related to the intermediate position 110. The intermediate position 112 has the same displacement relative to the destination 114 as the intermediate position 104 has relative to the destination 102. If it is desired to move from the destination 112 to the destination 102, the head 14 is moved initially to the intermediate position 104 before being moved to the destination 102.

It will be appreciated that the movement of the head to an intermediate position such as the position 104 and then to a desired position such as the position 102 may not eliminate hysteresis effects in the head 14. Rather, the movement of the head 14 to the intermediate position 104 and then to the desired position 102 causes any hysteresis effects to be constant during the movement of the head from the intermediate position to the desired position. Since the hysteresis effects are constant during the movement of the head from the intermediate position to the desired position, any effects of hysteresis during the movement of the head to any desired position on the stator 12 are eliminated by moving the head to an intermediate position having the particular displacement relative to such desired position.

Although this invention has been disclosed and illustrated with reference to particular embodiments, the principles involved are susceptible for use in numerous other embodiments which will be apparent to persons skilled in the art The invention is, therefore, to be limited only as indicated by the scope of the appended claims.

I claim:

1. A method of moving a head relative to a platen to eliminate the effect of magnetic hysteresis between the head and the platen, including the following steps:

providing a magnetizable stator having a plurality of magnetic and nonmagnetic sections alternately disposed in a grid relationship along first and second coordinate axes, providing a head movable simultaneously relative to the stator along the first and second coordinate axes, providing in the head a first plurality of poles disposed in at least two pairs along the first axis, the poles in each pair being displaced in phase in a first relationship along the first axis relative to the magnetic and paramagnetic sections of the stator and being displaced in phase, in a second relationship with respect to the poles in the other pair, along the first axis relative to the magnetic and nonmagnetic sections of the stator, providing a first magnetization of the poles in each pair in the first plurality, producing in the poles in each pair in the first plurality an alternating magnetization at a frequency related at each instant to the desired speed of movement of the head relative to the platen along the first axis to provide at that instant an alternating magnetization of the poles in each pair with a particular place relationship to each other and to the poles in the other pair in accordance with the phase relationships of the poles to the magnetic and nonmagnetic sections in the stator along the first axis, providing in the head a second plurality of poles disposed in at least two pairs along the second axis, the poles in each pair in the second plurality being displaced in phase in the first relationship along the second axis relative to the magnetic and nonmagnetic sections of the stator and being displaced in phase in the second relationship, with respect to the poles in the other pair, along the second axis relative to the magnetic and paramagnetic sections of the stator, providing the first magnetization in the poles in each pair in the second plurality, producing in the poles in each pair in the second plurality an alternating magnetization at a frequency related at each instant to the desired speed of movement of the head relative to the platen along the second axis to provide at that instant an alternating magnetization of the poles in each pair in the second plurality with a particular phase relationship to each other and to the poles in the other pair in the second plurality in accordance with the phase relationships of the poles to the magnetic and nonmagnetic sections in the stator along the second axis, programming the head to move simultaneously along the first and second coordinate axes from present positions to intermediate positions each having the same displacement in distance and vectorial directions along the first and second coordinate axes from the next desired position and then to move from such intermediate position to such next desired position, the different desired positions having different locations on the stator, and providing simultaneously for the alternating magnetization of the poles in the first plurality and of the poles in the second plurality at particular frequencies in accordance with the programing of the head to obtain a simultaneous movement of the head relative to the stator along the first and second coordinate axes from each present position to each intermediate position and then from such intermediate position to each next desired position.

2. A method as set forth in claim 1 wherein
the alternately disposed magnetic and nonmagnetic sections in the stator have equal lengths along each of the first and second axes and wherein the poles in each pair in each of the first and second pluralities are effectively displaced from each other by a distance equal to the length of each of the magnetic and nonmagnetic sections and wherein the poles in each of the pairs in each of the first and second pluralities are effectively displaced from the poles in the other pair in such plurality by a distance equal to one half of the length of each of the sections and wherein the head travels along each of the first and second coordinate axes through a distance equal to the combined lengths of one magnetic section and one nonmagnetic sections along such axis in each cycle of the alternating magnetization in the poles disposed along such axis.

3. A method as set forth in claim 2 wherein
the alternating magnetization in the poles in each pair in the first and second pluralities is provided by the flow of current through a winding associated with the poles in such pair and wherein
the head is programmed to control the flow of current through the poles in such pair at each instant in accordance with the positioning desired of the head at that instant during the movement of the head from the present positions to the intermediate positions and then from the intermediate positions to the next desired positions.

4. A method as set forth in claim 1 wherein
each intermediate position is relatively close to the next desired position and wherein
each intermediate position is displaced in the first and second directions from the next desired position and wherein
the head is programmed to travel at a relatively slow speed simultaneously in the first and second coordinate directions between each intermediate position and each next desired position.

5. A method of moving a head relative to a stator along a particular axis to eliminate the effects of magnetic hysteresis between the head and the stator, including the following steps:
providing a stator having a grid formed from alternately disposed magnetic and nonmagnetic sections,
providing a head movable relative to the stator along the particular axis,
providing in the head first and second pairs of poles displaced from one another along the particular axis, the poles in each pair having a first particular phase relationship to each other and a second particular phase relationship to the poles in the other pair, the phases of the poles being considered relative to the magnetic and nonmagnetic sections of the stator,
programming the head to move to a plurality of successive desired destinations along the particular axis and to stop at each such destination before moving to the next desired destination.
programming the head to move initially to a plurality of intermediate positions, each displaced by the same distance and vectorial direction along the particular axis from a next one of the desired destinations, after moving to the previous desired destination and before moving to the next desired destination, the desired destinations having different locations on the stator, and
providing for the variation in the magnetization in each of the poles at each instant, in accordance with the programming of the head, at a frequency dependent upon the speed desired to be produced in the head along the particular axis at that instant and with a phase related to the phase disposition of that pole with respect to the magnetic and nonmagnetic sections of the stator along the particular axis at that instant to obtain a movement of the head relative to the stator along the particular axis to each of the intermediate positions, and then to each of such next desired destinations, along the particular axis.

6. A method as set forth in claim 5 wherein
the head is programmed so that each intermediate position in relatively close to the next desired destination and it displaced vectorially in a particular direction along the particular axis from the next desired destination and so that the head will move from the intermediate position to the next desired destination.

7. A method as set forth in claim 6 wherein
the poles in each pair are displaced from each other by an integral multiple, with an odd value, of the length of each of the magnetic and nonmagnetic sectors in the stator and the poles in each pair are displaced from the poles in the other pair by one half of the displacement between the poles in the pair.

8. A method as set forth in claim 7 wherein
the poles in each pair are provided with a magnetization in a particular direction and with a particular magnitude of magnetization and wherein a pair of windings are provided and each winding is magnetically coupled to an individual pair of the poles and wherein the windings are responsive to the programmings to receive alternating current at a particular frequency dependent upon the distance between each previous desired destination and the intermediate position associated with the next desired destination and then dependent upon the distance between such intermediate position and such next desired destination to obtain the movement of the head relative to the stator along the particular axis from such previous desired position to such intermediate position and then to such next desired destination.

9. A method of moving a head relative to a stator along a particular axis to eliminate the affects of magnetic hysteresis between the head and the stator, including the steps of:
providing a stator having a plurality of magnetic and nonmagnetic sections alternatively disposed along the particular axis,
providing a head movable relative to the stator along the particular axis,
disposing the head in contiguous relationship to the stator,
programming the head to move through particular numbers of the sections on the stator to a plurality of successive desired destinations along the particular axis,
programming the head to move through a particular number of sections on the stator to a plurality of intermediate positions each associated with an individual one of the successive desired destinations and each displaced by the same distance from the associated desired destination in the same vectorial direction along the particular axis, the destinations being disposed at different positions on the stator, and
providing for an alternating energizing of the head, in accordance with the programming of the head, to obtain a movement of the head, synchronously with such alternating energizing, initially to each of the intermediate positions and then to the next desired destination before proceeding to the next intermediate position and the destination desired after such next desired destination.

10. A method as set forth in claim 1, including the steps of:
providing the stator with alternately disposed magnetic and nonmagnetic sections along a second axis coordinate with the particular axis,
providing for a movement of the head relative to the stator along the second axis,
programming the head to move through particular numbers of sections along the second axis on the stator to a plurality of successive desired destinations along the second axis,
programming the head to move through particular numbers of sections along the second axis on the stator to a plurality of intermediate positions, each of the intermediate positions being associated with an individual one of the successive desired destinations and being displaced by the same distance along the second axis from such related destination in the same vectorial direction along the second axis, and
providing for an alternating energizing of the head, in accordance with the programming of the head, to obtain a movement of the head to each of the intermediate positions along the second axis and then to the next desired destination along the second axis intermediate before proceeding to the next intermediate position and the destination desired along the second axis after the next desired destination,
the head being constructed, and the programming being provided, to obtain a movement of the head relative to the stator simultaneously along the first and second axes.

11. A method as set forth in claim 9 wherein
the between each intermediate position and each next desired destination distance is relatively small to provide a movement of the head relative to the stator along the particular axis at a relatively slow speed between each intermediate position and such next desired destination.

12. A method as set forth in claim 10 wherein
each intermediate position is displaced by a relatively small distance from the next desired destination to provide a movement of the head relative to the stator along the particular and second axes at relatively slow speeds along both axes between the intermediate position and such desired destination and wherein alternating signals are applied to the head to obtain the movement of the head relative to the stator along the particular and second axes and wherein the head is programmed to receive the alternating signals and wherein the head is constructed to move along the particular and second axes relative to the stator in synchronism with the alternating signals applied to the head.

* * * * *